United States Patent
Rueter (10) Patent No.: US 7,067,103 B2
(45) Date of Patent: Jun. 27, 2006

(54) DIRECT HYDROGEN PEROXIDE PRODUCTION USING STAGED HYDROGEN ADDITION

(75) Inventor: Michael Rueter, Plymouth Meeting, PA (US)

(73) Assignee: Headwaters Nanokinetix, Inc., Lawrenceville, NJ (US)

(*) Notice: Subject to any disclaimer, the term of this patent is extended or adjusted under 35 U.S.C. 154(b) by 491 days.

(21) Appl. No.: 10/401,351

(22) Filed: Mar. 28, 2003

(65) Prior Publication Data

US 2004/0191159 A1    Sep. 30, 2004

(51) Int. Cl.
*C01B 15/029*    (2006.01)
(52) U.S. Cl. ...................................... 423/584
(58) Field of Classification Search ............... 423/584
See application file for complete search history.

(56) References Cited

U.S. PATENT DOCUMENTS

| | | |
|---|---|---|
| 4,007,256 A | 2/1977 | Kim et al. |
| 4,009,252 A | 2/1977 | Izumi et al. |
| 4,028,274 A | 6/1977 | Kunz |
| 4,064,154 A | 12/1977 | Chadra et al. |
| 4,083,803 A | 4/1978 | Oswald et al. |
| 4,128,627 A | 12/1978 | Dyer et al. |
| 4,148,750 A | 4/1979 | Pine |
| 4,279,883 A | 7/1981 | Izumi et al. |
| 4,313,806 A | 2/1982 | Dalton, Jr. et al. |
| 4,335,092 A | 6/1982 | Dalton, Jr. et al. |
| 4,336,238 A | 6/1982 | Dalton, Jr. et al. |
| 4,336,239 A | 6/1982 | Dalton, Jr. et al. |
| 4,336,240 A | 6/1982 | Moseley et al. |
| 4,347,231 A | 8/1982 | Michaelson |
| 4,347,232 A | 8/1982 | Michaelson |
| 4,366,085 A | 12/1982 | Ikegami et al. |
| 4,369,128 A | 1/1983 | Moseley et al. |
| 4,379,778 A | 4/1983 | Dalton, Jr. et al. |
| 4,476,242 A | 10/1984 | Puskas et al. |
| 4,503,160 A | 3/1985 | Williams |
| 4,513,098 A | 4/1985 | Tsao |
| 4,661,337 A | 4/1987 | Brill |
| 4,681,751 A | 7/1987 | Gosser |
| 4,701,428 A | 10/1987 | Bellussi et al. |
| 4,713,363 A | 12/1987 | Hucul |
| 4,772,458 A | 9/1988 | Gosser et al. |
| 4,824,976 A | 4/1989 | Clerici et al. |
| 4,826,795 A | 5/1989 | Kitson et al. |
| 4,832,938 A | 5/1989 | Gosser et al. |

(Continued)

FOREIGN PATENT DOCUMENTS

EP    0 864 362    9/1998

(Continued)

OTHER PUBLICATIONS

Ahmadi, et al., "Shape-Controlled Synthesis of Colloidal Platinum Nanoparticles" *Science*, vol. 272, pp. 1924-1926 (Jun. 28, 1996).

(Continued)

*Primary Examiner*—Wayne A. Langel
(74) *Attorney, Agent, or Firm*—Workman Nydegger (57) ABSTRACT

An improved catalytic process for producing hydrogen peroxide directly by reaction of hydrogen and oxygen is disclosed. The process employs staged or sequential feeding of portions of the hydrogen feedstream into zones in the catalytic reactor in amounts sufficient to maintain an essentially constant and preferred ratio of oxygen to hydrogen at the inlet to each of the vessel's zones whereby high selectivity for hydrogen peroxide production is achieved and excess oxygen recycle requirements are minimized.

24 Claims, 1 Drawing Sheet

Example of Stage Catalytic Reactor Vessel

U.S. PATENT DOCUMENTS

| | | |
|---|---|---|
| 4,889,705 A | 12/1989 | Gosser |
| 4,937,216 A | 6/1990 | Clerici et al. |
| 4,937,220 A | 6/1990 | Nickols, Jr. |
| 4,983,558 A | 1/1991 | Born et al. |
| 4,996,039 A | 2/1991 | Pralus et al. |
| 5,017,535 A | 5/1991 | Schoonhoven et al. |
| 5,024,905 A | 6/1991 | Itoh et al. |
| 5,061,671 A | 10/1991 | Kitson et al. |
| 5,082,647 A | 1/1992 | Chuang |
| 5,096,866 A | 3/1992 | Itoh et al. |
| 5,104,635 A | 4/1992 | Kanada et al. |
| 5,128,114 A | 7/1992 | Schwartz |
| 5,132,099 A | 7/1992 | Hiramatsu et al. |
| 5,135,731 A | 8/1992 | Gosser et al. |
| 5,166,372 A | 11/1992 | Crocco et al. |
| 5,169,618 A | 12/1992 | Maraschino |
| 5,180,573 A | 1/1993 | Hiramatsu et al. |
| 5,194,242 A | 3/1993 | Paoli |
| 5,214,168 A | 5/1993 | Zajacek et al. |
| 5,234,584 A | 8/1993 | Birbara et al. |
| 5,236,692 A | 8/1993 | Nagashima et al. |
| 5,320,821 A | 6/1994 | Nagashima et al. |
| 5,338,531 A | 8/1994 | Chuang et al. |
| 5,352,645 A | 10/1994 | Schwartz |
| 5,362,405 A | 11/1994 | Birbara |
| 5,372,981 A | 12/1994 | Witherspoon |
| 5,378,450 A | 1/1995 | Tomita et al. |
| 5,391,531 A | 2/1995 | Ward |
| 5,399,344 A | 3/1995 | Yang et al. |
| 5,447,706 A | 9/1995 | Van Weynbergh et al. |
| 5,460,734 A | 10/1995 | Birbara et al. |
| 5,480,629 A | 1/1996 | Thompson et al. |
| 5,496,532 A | 3/1996 | Monzen et al. |
| 5,500,202 A | 3/1996 | Germain et al. |
| 5,505,921 A | 4/1996 | Luckoff et al. |
| 5,583,085 A | 12/1996 | Ward |
| 5,641,467 A | 6/1997 | Huckins |
| 5,698,488 A | 12/1997 | Birbara et al. |
| 5,767,036 A | 6/1998 | Freund et al. |
| 5,846,895 A | 12/1998 | Gila et al. |
| 5,851,948 A | 12/1998 | Chuang et al. |
| 5,859,265 A | 1/1999 | Muller et al. |
| 5,900,386 A | 5/1999 | Freund et al. |
| 5,912,367 A | 6/1999 | Chang |
| 5,961,948 A | 10/1999 | Wanngard |
| 5,965,101 A | 10/1999 | Goto et al. |
| 5,972,305 A | 10/1999 | Park et al. |
| 5,976,486 A | 11/1999 | Thompson et al. |
| 6,005,155 A | 12/1999 | Sun |
| 6,042,804 A | 3/2000 | Huckins |
| 6,054,507 A | 4/2000 | Funaki et al. |
| 6,090,858 A | 7/2000 | El-Sayed |
| 6,106,797 A | 8/2000 | Muller et al. |
| 6,117,409 A | 9/2000 | Bertsch-Frank et al. |
| 6,127,307 A | 10/2000 | Muller et al. |
| 6,159,267 A | 12/2000 | Hampden-Smith |
| 6,168,775 B1 | 1/2001 | Zhou et al. |
| 6,194,338 B1 | 2/2001 | Andolfatto et al. |
| 6,210,651 B1 | 4/2001 | Nystrom et al. |
| 6,239,054 B1 | 5/2001 | Shukis et al. |
| 6,284,213 B1 | 9/2001 | Paparatto et al. |
| 6,299,852 B1 | 10/2001 | Nystrom et al. |
| 6,307,073 B1 | 10/2001 | Jones |
| 6,331,500 B1 | 12/2001 | Tsuji et al. |
| 6,375,920 B1 | 4/2002 | Fischer et al. |
| 6,387,346 B1 | 5/2002 | Bertsch-Frank et al. |
| 6,447,743 B1* | 9/2002 | Devic et al. ............. 423/584 |
| 6,468,496 B1 | 10/2002 | Jones et al. |
| 6,500,968 B1 | 12/2002 | Zhou et al. |
| 6,500,969 B1 | 12/2002 | Zhou et al. |
| 6,504,040 B1 | 1/2003 | Vogtel et al. |
| 6,518,217 B1 | 2/2003 | Xing et al. |
| 6,528,683 B1 | 3/2003 | Heidemann et al. |
| 6,534,440 B1 | 3/2003 | Choudhary et al. |
| 6,534,661 B1 | 3/2003 | Zhou et al. |
| 6,551,960 B1 | 4/2003 | Laine et al. |
| 6,576,214 B1 | 6/2003 | Zhou et al. |
| 6,630,118 B1 | 10/2003 | Paparatto et al. |
| 6,635,348 B1 | 10/2003 | Hampden-Smith |
| 6,649,140 B1 | 11/2003 | Paparatto et al. |
| 6,676,919 B1 | 1/2004 | Fischer et al. |
| 6,713,036 B1 | 3/2004 | Vanden Bussche et al. |
| 6,740,615 B1 | 5/2004 | Zhou |
| 6,746,597 B1 | 6/2004 | Zhou et al. |
| 6,764,671 B1 | 7/2004 | Haas et al. |
| 6,768,013 B1 | 7/2004 | Pujado |
| 6,872,377 B1 | 3/2005 | Fischer et al. |
| 6,888,013 B1 | 5/2005 | Paparrato et al. |
| 2001/0024634 A1 | 9/2001 | Bertsch-Frank et al. |
| 2002/0028164 A1 | 3/2002 | Schutte et al. |
| 2003/0086853 A1 | 5/2003 | Devic |
| 2003/0180212 A1* | 9/2003 | Huckins .................. 423/584 |
| 2003/0215383 A1 | 11/2003 | Escrig et al. |
| 2004/0013601 A1 | 1/2004 | Butz et al. |
| 2004/0037769 A1 | 2/2004 | Paparatto et al. |
| 2004/0037770 A1 | 2/2004 | Fischer et al. |
| 2004/0081611 A1 | 4/2004 | Muller et al. |
| 2004/0126312 A1 | 7/2004 | Butz et al. |
| 2004/0151659 A1 | 8/2004 | Paparatto et al. |
| 2004/0151660 A1 | 8/2004 | Paparatto et al. |
| 2004/0184983 A1 | 9/2004 | Paparatto et al. |

FOREIGN PATENT DOCUMENTS

| | | |
|---|---|---|
| EP | 0 978 316 | 2/2000 |
| EP | 1 160 195 | 12/2001 |
| EP | 1 160 196 | 12/2001 |
| EP | 1 277 701 | 7/2002 |
| EP | 1 308 416 | 5/2003 |
| EP | 1 344 747 | 9/2003 |
| GB | 1056123 | 1/1967 |
| GB | 1056125 | 1/1967 |
| GB | 1056126 | 1/1967 |
| GB | 1094804 | 12/1967 |
| JP | 05017106 | 1/1993 |
| JP | 07033410 | 2/1995 |
| JP | 07069604 | 3/1995 |
| JP | 07069605 | 3/1995 |
| JP | 07241473 | 9/1995 |
| JP | 09241009 | 9/1997 |
| JP | 09301705 | 11/1997 |
| JP | 10324507 | 12/1998 |
| JP | 10330103 | 12/1998 |
| JP | 11060213 | 3/1999 |
| JP | 11139812 | 5/1999 |
| JP | 2003010693 | 1/2003 |
| JP | 2003024794 | 1/2003 |
| WO | WO 97/32811 | 9/1997 |
| WO | WO 97/32812 | 9/1997 |
| WO | WO 98/10863 | 3/1998 |
| WO | WO 00/59635 | 10/2000 |
| WO | WO 01/05498 | 1/2001 |
| WO | WO 01/05501 | 1/2001 |
| WO | WO 02/14217 | 2/2002 |
| WO | WO 02/14299 | 2/2002 |
| WO | WO 02/28527 | 4/2002 |
| WO | WO 02/28528 | 4/2002 |
| WO | WO 02/83550 | 10/2002 |
| WO | WO 02/92501 | 11/2002 |
| WO | WO 02/92502 | 11/2002 |
| WO | WO 03/14014 | 2/2003 |
| WO | WO 04078740 | 9/2004 |

OTHER PUBLICATIONS

Li, et al., "Carbon Nanotubes as Support for Cathode Catalyst of a Direct Methanol Fuel Cell", *Letters to the Editor/Carbon 40*, Dalian University of Technology, pp. 787-803 (Jan. 18, 2002).

Li, et al., "Preparation and Characterization of Multiwalled Carbon Nanotube-Supported Platinum for Cathode Catalysts of Direct Methanol Fuel Cells", *J. Phys. Chem*, B, vol. 107, pp. 6292-6299 (Jun. 6, 2003).

Lordi, et al., "Method for Supporting Platinum on Single-Walled Carbon Nanotubes for a Selective hydrogenation Catalyst", *Chem. Mater.*, vol. 13, pp. 733-737 (Feb. 10, 2001).

Zhou, et al., "Novel Synthesis of Highly Active Pt/C Cathode Electrocatalyst for Direct Methanol Fuel Cell" Chem. Commun. 2003, pp. 394-395, no month.

Zhou, et al. "Preparation and Characterization of Anode Catalysts PtRu/C for Direct Methanol Fuel Cells" Chemical Journal of Chinese Universities, vol. 24, 2003, pp. 885-862, no month.

* cited by examiner

Figure 1: Example of Stage Catalytic Reactor Vessel

DIRECT HYDROGEN PEROXIDE PRODUCTION USING STAGED HYDROGEN ADDITION

FIELD OF THE INVENTION

The invention relates to an improved catalytic process for producing hydrogen peroxide directly by reaction of hydrogen and oxygen. The process involves sequentially staged or serial feeding of portions of the hydrogen feedstream to the continuous catalytic reactor downstream from the initial locus of the feedstream entrance to the reactor. The staged addition of hydrogen allows preferred oxygen to hydrogen stoichiometry to be maintained throughout the reactor. This significantly reduces the amount of unconverted oxygen, thereby reducing or eliminating the need for recompression and recycling of effluent gases while improving the selectivity of the catalytic reaction.

BACKGROUND OF THE INVENTION

While the direct production of hydrogen peroxide ($H_2O_2$) from hydrogen ($H_2$) and oxygen ($O_2$) is known in the art, commercial processes are typically indirect processes using a hydrogen donor organic compound as the source of hydrogen needed to react with oxygen in order to circumvent the explosive hazard of direct mixtures of hydrogen and oxygen. Usually, anthraquinone or a derivative thereof is employed as a hydrogen donor molecule by first reducing the molecule to the dihydro moiety and then oxidizing the reduced dihydro moiety with oxygen to yield hydrogen peroxide and the starting anthraquinone. While a relatively safe process, the indirect process has many drawbacks, not the least of which is the fact that it is a multistep process which consumes anthraquinone and solvent by oxidation.

The direct catalytic production of hydrogen peroxide from hydrogen and oxygen, although well-studied, has not achieved commercial acceptance as yet. When the direct process is carried out at hydrogen levels below 5% by volume to avoid the explosive hydrogen gas mixture range, the yields of hydrogen peroxide are low. Further, the process selectivity is low as a consequence of the conversion of hydrogen peroxide to water in the catalytic environment. The cost of hydrogen and oxygen is an important economic factor in the direct synthesis process. Inefficiencies in their use caused by low selectivity constitute a significant problem.

Another significant economic problem in direct hydrogen peroxide production arises from the use of large gas excesses. It is common practice in direct synthesis processes to employ large excesses of one of the gaseous components, especially oxygen. Consequently, large gas flows must be handled in the process. Since direct synthesis processes typically operate at pressures of at least 500 psig, and often greater than 1000 psig, the copious amount of excess oxygen in the reaction mixture which must be recompressed for recycle imposes a significant cost burden on the process. Large and expensive compressors are required to accommodate the recycle stream from direct synthesis processes that employ excessively large oxygen flows.

It is also well known in the prior art that the ratio of oxygen and hydrogen gases in the direct catalytic synthesis process has a critical effect on the yield of hydrogen peroxide produced as well as the selectivity of the process for hydrogen peroxide production. U.S. Pat. No. 4,336,239 teaches a direct synthesis hydrogen peroxide production process using noble metal catalysts where the molar ratio of oxygen to hydrogen is greater than about 3.4, preferably above 5 and most preferably a molar ratio of 12–15, at catalyst loadings of more than 30 mg per 100 ml of medium. According to the '239 patent, higher oxygen to hydrogen ratios above 3.4 results in an increase in the amount of hydrogen peroxide obtained.

U.S. Pat. No. 6,375,920 teaches a reactor system for hydrogen peroxide production wherein hydrogen is fed to the reactor in staged points of entry above an oxygen and hydrogen inlet. The process is distinguished by employing a woven catalyst having a long on-stream life in a fixed bed reactor which produces a selectivity of above 65%. The patent does not teach or claim the adjustment of the oxygen to hydrogen gas ratio at each stage to provide a preferred ratio that yields a minimum volume of a recycle stream U.S. Pat. No. 6,447,743 teaches a method for preparing hydrogen peroxide directly using staged oxygen addition into the reactor at a relatively high ratio of oxygen to hydrogen.

U.S. Pat. No. 5,641,467 to Huckins teaches and claims a method for safe hydrogen peroxide production in a catalytic reactor by injecting oxygen or oxygen and hydrogen into a flowing medium at multiple points downstream in a catalytic reactor. The volumetric ratios of flowing medium to injected hydrogen and/or oxygen are selected to preferable maintain a safe combination of hydrogen to oxygen or where the volume ratio of oxygen to hydrogen is from 1:1 to 20:1. However, the patent does not teach or claim the staged injection of hydrogen at varying hydrogen to oxygen ratios preselected to maximize the conversion and selectivity of hydrogen peroxide production while producing low oxygen recycle ratios.

U.S. Pat. No. 6,042,804 is related to the foregoing '467 patent and teaches and claims separation of hydrogen peroxide plus process operating conditions within the explosive limits of hydrogen gas and oxygen mixtures.

It is an objective of the present invention to provide a process for the direct continuous synthesis of hydrogen peroxide from hydrogen gas and oxygen in a catalytic reactor that avoids the necessity of feeding a large excess of oxygen that results in a substantial recycle stream of unconverted oxygen. It is a further objective of the invention to provide such a process that avoids the production of and need for recycling a large excess of oxygen but, nevertheless, achieves improved process conversion of hydrogen and oxygen to hydrogen peroxide with high selectivity.

SUMMARY OF THE INVENTION

The invention describes an improved process for the production of hydrogen peroxide by the direct reaction of oxygen and hydrogen. The governing principle of the invention is the fact that performance of the direct synthesis process is significantly improved in terms of process selectivity and conversion when the oxygen concentration in the direct synthesis feedstream is higher than at least 50 weight percent or preferably at least 70 weight percent. Additionally, performance is improved when the oxygen to hydrogen molar ratio is preferably greater than a value of about 1.5 or, preferably, greater than 3. However, these preferred values of oxygen concentration and oxygen to hydrogen molar ratio typically require the use of excesses of oxygen feed, and therefore lead to effluent gas flows containing large amounts of oxygen which must be recompressed and recycled to the process at a significant economic penalty.

The hydrogen peroxide process of the present invention allows the overall hydrogen and oxygen feeds to the direct synthesis reactor to be maintained at or near the desired stoichiometric molar ratio of approximately 1:1 which eliminates the need for large excesses of oxygen. This is achieved while distributing the oxygen and hydrogen feedstreams to the reactor in a manner that maintains the desired minimum concentration of oxygen in the reactor for hydrogen peroxide production while maintaining the desired molar ratio of oxygen to hydrogen in most or the entire continuous reactor. As a result, high values of selectivity and yield of hydrogen peroxide are realized in the process of the invention without experiencing the production of large excesses of unconverted oxygen that require recompression with large compressors and recycling of large quantities of oxygen to the direct synthesis reactor. The objects of the invention are realized by a staged addition of hydrogen to a multi-zoned reactor where portions of the hydrogen fed to the reactor are injected at points downstream of the reactor first inlet.

More particularly, the invention comprises a multizoned or multistaged direct catalytic process for the production of hydrogen peroxide from hydrogen and oxygen feedstreams wherein catalyst in decreasing amounts is loaded into serially connected catalyst conversion zones in a catalytic reactor. The zones comprise a first zone and at least one receivably connected intermediate or terminal zone maintained under conditions sufficient to convert hydrogen and oxygen to hydrogen peroxide. All of an oxygen feedstream and a major portion of a hydrogen feedstream are passed into the first conversion zone at an inlet molar ratio of oxygen to hydrogen between 1.5 and 10. Sequentially decreasing portions of the remaining fresh hydrogen feedstream are passed to the inlet of each of the receivably connected serial intermediate or terminal conversion zones at a zone inlet molar ratio of oxygen to hydrogen the same as that employed in the first zone inlet. Hydrogen peroxide and unconverted hydrogen and oxygen are recovered from the terminal zone effluent. Optionally, the unconverted oxygen and hydrogen from the terminal zone effluent are recycled or sufficient quantities of hydrogen and oxygen are utilized in a single pass process that obviates the necessity of recycling the reactor's gaseous effluent. Notably, the molar ratio of oxygen to hydrogen in the combined total of oxygen and hydrogen feedstreams is less than the inlet molar ratio of oxygen to hydrogen introduced into each of the conversion zones.

Preferably, most of the oxygen plus a portion of the hydrogen feedstream and a liquid media feedstream in a molar ratio of oxygen to hydrogen between 1.5 and 10 are introduced into the first catalyst-containing stage of the staged catalytic reactor. Hydrogen is fed into the downstream feedstream containing hydrogen peroxide, unconverted oxygen and hydrogen in all subsequent catalyst-containing stages in an amount sufficient to reestablish the molar ratio of oxygen to hydrogen at the inlet of each stage to correspond to the molar ratio established at the first stage inlet. More particularly, additional amounts of hydrogen are fed into the second and subsequent catalyst-containing stages along with the entire effluent from the previous stage The multizoned or multistaged direct catalytic process of the invention includes at least one reactor with serially connected conversion zones of successively decreasing size. In one embodiment of the invention, the reactor is of the fixed bed or ebullated bed type, and the serially connected zones of the reactor each contain successively decreasing amounts of catalyst, either immobilized as a fixed bed or agitated as an ebullated bed. In another embodiment, the reactor is of the slurry or fluidized bed type, where the liquid/solid slurry of reaction liquid and catalyst passes through a series of reactor zones of successively decreasing volume. For the fixed bed reactor, the size of each zone is defined by the amount of catalyst loaded into that zone. For the slurry/fluidized bed reactor, the catalyst is dispersed and travels along with the liquid phase. The size of each zone is determined by the reactor volume which, in turn, determines how long the liquid/solid mixture stays in each zone.

DETAILED DESCRIPTION OF THE INVENTION

The present invention is a process for the production of hydrogen peroxide by direct synthesis from oxygen and hydrogen that avoids the use of a large excess of one gas reactant and provides a means to achieve high selectivity, it has been found that high selectivity of hydrogen peroxide production can be achieved if the direct synthesis is carried out using an overall gas composition where the oxygen concentration is at least 50% by volume of the total gas feed, and preferably at least 70%. It has also been determined that high selectivity for hydrogen peroxide production can be achieved by maintaining an oxygen-to-hydrogen ratio, molar or volume, of at least 2 to 1, and preferably at least 3 to 1 in the reactor.

While excess oxygen is preferred in the process in order to achieve high selectivity for hydrogen peroxide production, in either or both of the above cases the significant amount of excess oxygen used must be recovered and recycled in the process to maintain an economically feasible process. But the cost of oxygen recycle is itself a serious economic liability for the process because the amount of oxygen to be recycled dictates the use of large and expensive compressors.

The present invention provides a means to operate a continuous direct hydrogen peroxide synthesis process under the foregoing preferred process conditions of overall oxygen concentration in the reactor and the preferred ratios of oxygen to hydrogen while avoiding the need for a significant excess of oxygen in the overall rector feed. The process of the invention provides a substantially diminished requirement in terms of the volume of the oxygen recycle stream and, consequently, the size of the required recycle compressors. In one preferred embodiment, the process of the invention can completely eliminate the need for recycling of unconverted gases. These advantages are realized by carrying out the continuous direct synthesis of hydrogen peroxide in a catalytic reactor where the hydrogen gas that is fed to the reactor overall is injected serially in diminishing discrete stages along the reactor length. The amount of catalyst in each stage decreases from the first to the last stage of hydrogen gas injection corresponding to the decrease in the amount of hydrogen gas injected or fed at each stage. The amount of hydrogen injected at each stage is held to an amount sufficient to establish essentially the same ratio of oxygen to hydrogen at the locus of inject for all stages. Preferably, the ratio of oxygen to hydrogen for all stages taken at their inlet hydrogen feed position is a constant selected from 1.5 to 10, but more preferably from 2 to 4.

Figure 1:
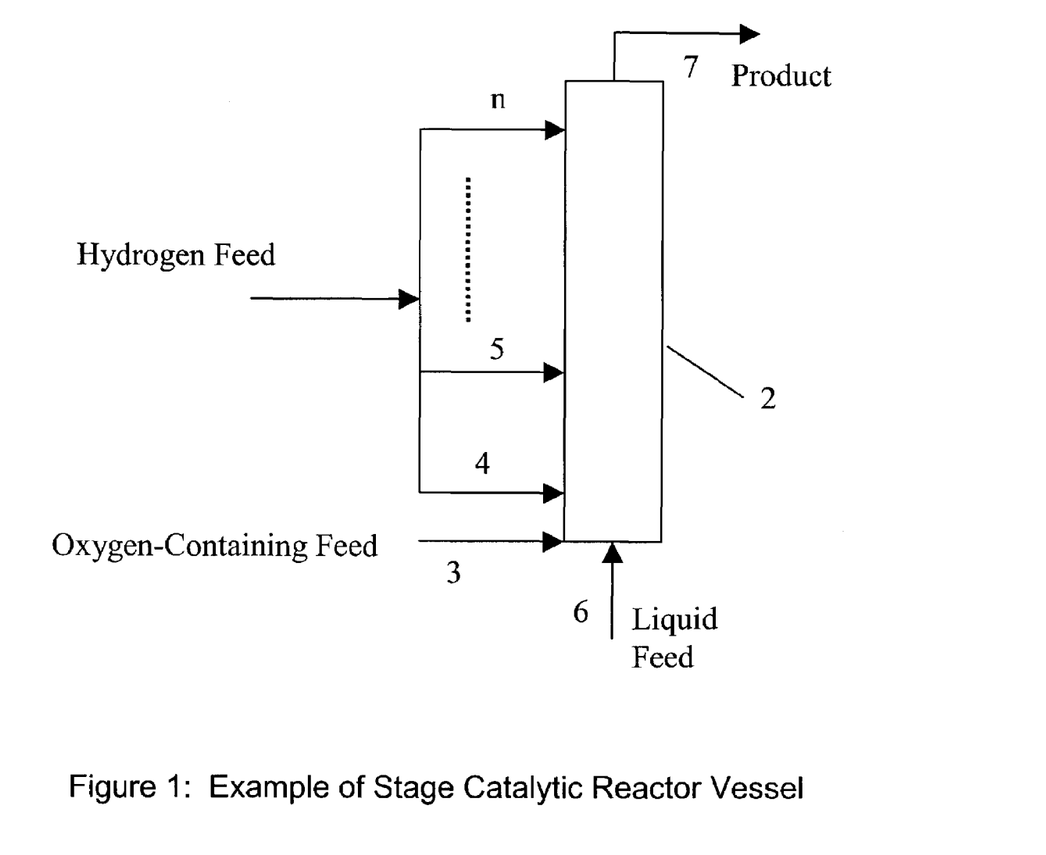
The FIGURE is a drawing depicting one example of the staged catalytic reactor vessel of the invention for the direct production of hydrogen peroxide.

Referring to the FIGURE, one schematic example of the reactor vessel useful in the process of the invention is presented. The reactor shell 2 contains multiple ports of feed entry including inlet 3 for feeding all of the oxygen and inlet ports 4, 5 and n for introducing hydrogen. An essentially inert media feed may be introduced into the bottom of the reactor at 6 and product collected as an overhead stream 7.

One key characteristic of the reactor is that there is little or no back-mixing of the gas flow throughout the reactor vessel. The reactor has an essentially plug flow configuration with respect to the gas flow whereas the liquid flow may be plug flow or back mixed. Another characteristic of the process of the invention is that the oxygen containing feed, which may be oxygen, air, enriched air, or any other oxygen containing gas is fed entirely to the first stage of the reactor, i.e., the first inlet to the reactor. Yet another distinguishing characteristic of the process of the invention is that the hydrogen feed is divided into multiple fractions, only one of which is fed at the reactor entrance along with all of the oxygen-containing gas. The remainder of the hydrogen feed is injected in decreasing amounts at the subsequent downstream stages of the reactor. The number of stages in the reactor may be arbitrarily selected, but it is preferable to provide at least two hydrogen feed injection plus the first injection point where all of the oxygen feed plus a major portion of the hydrogen gas feed is injected. Although larger numbers of injection points can be used to provide very uniform gas compositions, excessive numbers will make the reactor design needlessly complicated. In practice, it is preferred to use no more than 6 injection points.

Each stage of the reactor vessel contains catalyst, preferably supported noble metal catalyst particles, preferably in decreasing amounts progressing from the first stage to the terminal or last stage wherein the amount of catalyst in any one stage corresponds approximately to the total quantity of oxygen and hydrogen present at the inlet of the specific stage. The ratio of oxygen to hydrogen at the inlet of each stage is predetermined to be constant or the same for each stage, although it is recognized that the ratio of oxygen to hydrogen within each stage will rise sequentially as the reactants linearly traverse each stage of the reactor. However, the hydrogen addition that is carried out at each stage is in an amount sufficient to adjust or lower the oxygen to hydrogen ratio to the preferred consistent ratio. The hydrogen feed may be divided into equal fractions or unequal fractions and the injection points may be equally spaced or unequally spaced without departing from the requirement of the invention for maintaining the oxygen to hydrogen ratio at the same preferred ratio at the inlet of each successive stage.

A particular useful aspect of the present invention is the fact that the process of the invention avoids the requirement of many hydrogen peroxide processes of the prior art to execute the process a staged hydrogen additions simply to assure that the process operates below the flammability or explosive limits of hydrogen. The process of the present invention is not limited to any such requirement. The process may run within the explosive limits of hydrogen or outside those limits.

The preferred gas composition ranges of the invention are selected according to a completely different set of criteria than those imposed by the prior art relating to hydrogen peroxide production. It has been found that the process of the present invention can continuously produce extremely high selectivity for hydrogen peroxide production exceeding 80% and even exceeding 90% selectivity when the process is carried under the conditions described herein. This benefit is not anticipated in the prior art.

A preferred embodiment of the subject invention is one where the overall hydrogen and oxygen feed rates to the reactor are close to the stoichiometric ratio required for the reaction to produce hydrogen peroxide. In cases of high hydrogen peroxide selectivity, the desired ratio of oxygen to hydrogen is approximately 1:1. However, in cases where the overall selectivity is less than 100%, the actual stoichiometry of the reaction corresponds to lower oxygen to hydrogen ratios. This is because the non-selective side reaction of hydrogen and oxygen to form water consumes less oxygen than the desired reaction to form hydrogen peroxide.

Another preferred embodiment of the process of the invention is one where the process is operated at a high per pass conversion of the gaseous reactants. The preferred conversion of hydrogen should be at least 70%, and more preferably, at least 80%. In the case where the overall oxygen to hydrogen ratio is close to the actual stoichiometry, the per pass oxygen conversion is similarly high. The advantage of this embodiment is that most of the gas feeds are utilized in a once-through gas flow mode. This reduces or even eliminates the need for recompression and recycling of the effluent gas and achieves significant capital and operating cost savings.

A particularly advantageous embodiment of the invention is that where the direct synthesis reaction is conducted using the Pd/C catalysts as described in either applicant's U.S. Pat. No. 6,168,775B1 or in pending U.S. patent application Ser. No. 10/205,881, filed Jul. 26, 2002. Both the '775 U.S. patent and the pending 10/205,881 patent application are incorporated herein by reference for all that they teach and claim of catalysts useful in the process of the instant invention. Very high selectivity levels can be achieved using the '775 catalyst in the process of this invention. However, the present invention may be conducted using any direct synthesis catalyst.

An especially preferred mode for the subject invention is one where the reactor operation and multiple hydrogen feeds are arranged to provide for a relatively uniform oxygen-to-hydrogen ratio throughout the reactor. It is well-known in the literature that O2:H2 ratio exerts an important role in the selectivity and productivity of catalysts for the direct synthesis of hydrogen peroxide from hydrogen and oxygen. In particular, it is known that ratios of greater than 1.5:1 are preferred, and ratios of more than 3:1 are more preferred. However, no prior art provides a reactor that create a uniform distribution of oxygen-hydrogen ratios, while also avoiding the need for substantial and costly excesses of oxygen to maintain the preferred ratio.

In the preferred mode of the subject invention, a relatively uniform profile of O2:H2 ratios are maintained across the reactor by subdividing the reactor into a series of zones s described herein. While the zones may be of equal size, they are preferably designed to be of unequal size. In the case where the reactor is of the fixed bed type, each zone will be a section of packed catalyst wherein the "size" of the different sections is defined by the amount of catalyst packed in each section.

To the first reactor zone, essentially all of the oxygen is fed, as well as all of the liquid feed to the reactor, but only part of the hydrogen. Additional parts of the hydrogen feed are then fed at points intermediate between the ensuing reactor zones, until the last portion of hydrogen is fed just upstream of the final reactor zone.

Where the sizes of the reactor zones differ, the amount of hydrogen fed to each bed will also differ, although not necessarily in exact proportion to the sizes of the reaction zones. The key aspect is that the scheme for subdividing the hydrogen feed is predicated on achieving the desired uniform profile of oxygen/hydrogen ratio throughout the reactor.

While other arrangements are also possible, a further aspect of the preferred mode of the invention is that the differing sized reactor zones will preferably be arranged in order of decreasing size, with the largest reactor zone placed at the inlet part of the reactor, and the smallest located at the exit. Correspondingly, the part of hydrogen feed to the first reactor section will be largest, and that to the last bed will be the smallest.

The following examples are provided to illustrate the process of the invention as well as the utility of the invention.

EXAMPLE 1

A catalyst containing 0.75% Pd on a carbon support is packed into a fixed bed reactor where the reactor is subdivided into 4 zones or beds constituting stages in the process of the invention. The reactor is arranged for cocurrent upflow of liquid and gas streams. The first bed is located at the bottom of the reactor and the last bed is located at the top of the reactor. A total of 1667 kg of catalyst is charged to this reactor across the four zones. The total amount of catalyst and the hydrogen feed are subdivided between the stages according to:

| Catalyst Section | Catalyst Amount (kg) | Hydrogen Feed (kgmol/hr) |
|---|---|---|
| 1 (Inlet) | 764 | 250 |
| 2 | 474 | 114 |
| 3 | 271 | 59 |
| 4 (Outlet) | 158 | 32 |
| Total | 1667 | 454 |

To the inlet of the first bed is fed 111,794 kg/hr of a liquid feed mixture comprised of methanol with 1% $H_2SO_4$ and 5 ppm NaBr. Also fed to the first reactor section is 531 kgmol/hr of oxygen, which corresponds to an overall $O_2:H_2$ feed ratio of 1.17, or only 17% excess oxygen. The reactor is operated at a total pressure of 27.5 bar (~400 psia). Cooling is adjusted to maintain an average temperature of 45° C.

The following results were achieved:

| Reactor Section | Hydrogen Conversion (%) | Section Inlet $O_2:H_2$ ratio molar) | Section Outlet $O_2:H_2$ ratio (molar) | $H_2O_2$ Produced (kg/hr) |
|---|---|---|---|---|
| 1 | 75 | 2.13 | 5.66 | 5730 |
| 2 | 66 | 2.01 | 4.06 | 3553 |
| 3 | 56 | 2.04 | 3.44 | 2036 |
| 4 | 46 | 2.14 | 3.15 | 1183 |
| Overall | 90 | | | 12503 |

Based on hydrogen converted, the overall hydrogen peroxide selectivity is 90%. Based on hydrogen fed, the overall hydrogen peroxide yield is 81%. Based on total oxygen fed, the overall hydrogen peroxide yield is 69%. The product solution contains 10% hydrogen peroxide by weight. This example shows that with the present invention, a minimum $O_2:H_2$ ratio of 2 can be maintained while only feeding a 17% excess of oxygen on an overall basis.

EXAMPLE 2

A catalyst containing 0.75% Pd on a carbon support is packed into a fixed bed reactor where the reactor is subdivided into 4 zones or beds defining stages. The reactor is arranged for cocurrent upflow of liquid and gas streams, so the first bed is located at the bottom of the reactor and the last bed located at the top. A cooling medium is circulated through the shell of the reactor. A total of 1664 kg of catalyst is charged overall to this reactor with the catalyst amount subdivided between the sections according to:

| Catalyst Section | Catalyst Amount (kg) | Hydrogen Feed (kgmol/hr) |
|---|---|---|
| 1 (Inlet) | 689 | 211 |
| 2 | 458 | 116 |
| 3 | 306 | 77 |
| 4 (Outlet) | 212 | 50 |
| Total | 1664 | 454 |

To the inlet of the first bed is fed 111,624 kg/hr of a liquid feed mixture comprised of methanol with 1% $H_2SO_4$ and 5 ppm NaBr. Also fed to the first reactor section is 636 kgmol/hr of oxygen, which corresponds to an overall $O_2:H_2$ feed ratio of 1.4, or only 40% excess oxygen. The reactor is operated at a total pressure of 27.5 bar (~400 psia). Cooling is adjusted to maintain an average temperature of 45° C.

This leads to the following performance results:

| Reactor Section | Hydrogen Conversion (%) | Section Inlet $O_2:H_2$ Ratio (molar) | Section Outlet $O_2:H_2$ Ratio (molar) | $H_2O_2$ Produced (kg/hr) |
|---|---|---|---|---|
| 1 | 80 | 3.01 | 11.2 | 5168 |
| 2 | 71 | 3.01 | 8.04 | 3432 |
| 3 | 61 | 3.00 | 6.20 | 2296 |
| 4 | 53 | 3.04 | 5.39 | 1588 |
| Overall | 90 | | | 12484 |

Based on hydrogen converted, the overall hydrogen peroxide selectivity is 90%. Based on hydrogen fed, the overall hydrogen peroxide yield is 81%. Based on total oxygen fed, the overall hydrogen peroxide yield is 58%. The product solution contains 10% hydrogen peroxide by weight. This example shows that with the present invention, a minimum $O_2:H_2$ ratio of 3 can be maintained while only feeding a 40% excess of oxygen on an overall basis.

EXAMPLE 3

A catalyst containing 0.75% Pd on a carbon support is packed into a fixed bed reactor, where the reactor is subdivided into 4 zones or beds. The reactor is arranged for cocurrent upflow of liquid and gas streams, so the first bed is located at the bottom of the reactor, and the last bed located at the top. A total of 1655 kg of catalyst is charged to this reactor with the catalyst amount subdivided between the sections according to:

| Catalyst Section | Catalyst Amount (kg) | Hydrogen Feed (kgmol/hr) |
|---|---|---|
| 1 (Inlet) | 635 | 190 |
| 2 | 455 | 118 |
| 3 | 324 | 85 |
| 4 (Outlet) | 241 | 61 |
| Total | 1655 | 454 |

To the inlet of the first bed is fed 110,979 kg/hr of a liquid feed mixture comprised of methanol with 1% $H_2SO_4$ and 5 ppm NaBr. Also fed to the first reactor section is 758 kgmol/hr of oxygen, which corresponds to an overall O2:H2 feed ratio of 1.67, or only 67% excess oxygen. The reactor is operated at a total pressure of 27.5 bar (~400 psia). Cooling is adjusted to maintain an average temperature of 45° C.

This leads to the following performance results:

| Reactor Section | Hydrogen Conversion (%) | Section Inlet $O_2$:$H_2$ Ratio (molar) | Section Outlet $O_2$:$H_2$ Ratio (molar) | $H_2O_2$ Produced (kg/hr) |
|---|---|---|---|---|
| 1 | 82 | 4.00 | 17.9 | 4762 |
| 2 | 73 | 4.00 | 12.2 | 3410 |
| 3 | 63 | 4.00 | 9.19 | 2431 |
| 4 | 55 | 4.00 | 7.71 | 1809 |
| Overall | 90 | | | 12412 |

Based on hydrogen converted, the overall hydrogen peroxide selectivity is 90%. Based on hydrogen fed, the overall hydrogen peroxide yield is 81%. Based on total oxygen fed, the overall hydrogen peroxide yield is 48%. The product solution contains 10% hydrogen peroxide by weight. This example shows that with the present invention, a minimum $O_2$:$H_2$ ratio of 4 can be maintained while only feeding a 67% excess of oxygen on an overall basis.

The process of the invention lends itself well to the use of a variety of reactor types and configurations known to those skilled in the art. As noted herein before, staged reactors are known in the art and can be applied to fixed catalyst bed reactors, fluid bed reactors, ebullated catalyst bed reactors, catalyst slurry bed reactors and the like. These reactors are applicable as well to the process of the invention. They may be configured in a variety of ways known in the art such as a single, vertical reactor shell containing multiple zones or stages containing individual beds of catalyst particles and individual inlet ports to admit hydrogen feed. Optionally, each zone may comprise a separate reactor shell connected to receive the feedstream from a preceding stage and designed to discharge an effluent to the next stage. The choice as to whether the reactor(s) are installed as a single or multiple vertical reactor installation or a train of horizontal vessels is the artisan's option.

Any catalyst known to those skilled in the art of hydrogen peroxide production may be used in the process of the invention. However, it is well known that supported noble metal catalyst particles, particularly palladium on carbon support, are preferred as the catalyst for direct hydrogen peroxide production from oxygen and hydrogen gases. An especially useful catalyst is the supported palladium catalyst prepared by the process described in the previously mentioned U.S. Pat. No. 6,168,775. The catalyst described in that patent is the most preferred catalyst for the process of this invention.

The amount of catalyst used in each zone of the process of the invention is determined by consideration of a variety of variables including reactor type and size, catalyst activity and life, and the feedstream rate to each zone. Since all of the oxygen feed and a major portion of the hydrogen feed are introduced into the reactor in the first stage that stage will typically hold the preponderant share of catalyst particles.

A carrier liquid is preferably included as part of the total feedstream to the first zone of the reactor of the process of the invention to assist in partly dissolving the reactants and propelling the feedstream and products through the reactor. Preferred carrier liquids are water, organic solvents, and mixtures thereof. In cases where the preferred carrier includes, at least in part, an organic solvent, the preferred solvents are alcohols such as methanol.

Reaction conditions that are useful for the process of the invention include temperature of 0° to 150° C. and pressure from 1 bar to 100 bar (15 psia to 1500 psia). The more preferred reactions conditions include a temperature of about 30° C. to 45° C. at a pressure of 1 bar to 70 bar (4001015 psia). The amount of catalyst used in each zone of the multistaged reactor vessel of the process of the invention may be the same quantity for each stage or the quantity may vary for each stage. Most preferably, the hydrogen feed to each stage of the process declines from the first to the last stage as the oxygen feed that is fed only to the first stage declines in concentration in subsequent stages as it is converted to hydrogen peroxide. Accordingly, the amount of catalyst in each successive stage may be reduced in approximate proportion to the feedrate of hydrogen gas into the particular stage. The amount of catalyst will also depend on the type of catalytic vessel being employed, i.e., fixed bed, ebullated bed, etc. and the activity of the catalyst. These variables are well understood by artisans in the field who can select the amount of catalyst in each stage sufficient to optimally satisfy the variables. In the most preferred case, the catalyst will comprise palladium on carbon support for all stages with the catalyst optionally containing a minor amount of platinum in addition to the palladium.

What is claimed is:

1. A direct catalytic process for the production of hydrogen peroxide from hydrogen and oxygen feedstreams comprising:

maintaining a reactor containing catalyst particles in serially connected catalytic conversion zones of successively decreasing volume under conditions sufficient to convert hydrogen and oxygen to hydrogen peroxide, said zones comprising a first zone receivably connected to receive all of said oxygen feedstream and a portion of the hydrogen feedstream and intermediate or terminal zone(s) receivably connected to receive the remaining portion of the hydrogen feedstream, wherein the ratio of oxygen to hydrogen in the combination of all feedstreams to the reactor is less than the molar ratio of oxygen to hydrogen taken at the inlet into each of the conversion zones;

passing all of the oxygen feedstream and a major portion of the hydrogen feedstream into the first conversion zone of the reactor at an inlet molar ratio of oxygen to hydrogen between 1.5 and 10;

passing sequentially decreasing portions of the remaining portion of the hydrogen feedstream to each of the receivably connected serial intermediate or terminal conversion zones at a zone inlet molar ratio of oxygen to hydrogen about the same as that employed in the first zone;

recovering hydrogen peroxide and unconverted hydrogen and oxygen from the terminal zone effluent.

2. The process of claim 1 wherein the unconverted hydrogen and oxygen recovered from the terminal zone effluent is recompressed and recycled to the first zone inlet of the reactor.

3. The process of claim 1 wherein said catalytic reactor is a fixed bed reactor containing conversion zones comprising serially connected fixed catalyst beds.

4. The process of claim 1 wherein said catalytic reactor is an ebullated bed reactor containing conversion zones comprising serially connected ebullated catalyst beds.

5. The process of claim 1 wherein said catalytic reactor is a slurry bed reactor containing conversion zones comprising serially connected slurry catalyst beds.

6. The process of claim 1 wherein said catalytic process is carried out in a liquid reaction media comprising aqueous or organic solvents and mixtures thereof.

7. The process of claim 6 wherein the reaction media comprises a mixture of water and alcohol.

8. The process of claim 1 wherein the first conversion zone inlet molar ratio of oxygen to hydrogen is about 2 and the molar ratio of oxygen to hydrogen in the combination of all oxygen and hydrogen feedstreams is about 1.17.

9. The process of claim 1 wherein the first conversion zone inlet molar ratio of oxygen to hydrogen is about 3 and the molar ratio of oxygen to hydrogen in the combination of all oxygen and hydrogen feedstreams is about 1.4.

10. The process of claim 1 wherein the first conversion zone inlet molar ratio of oxygen to hydrogen is about 4 and the molar ratio of oxygen to hydrogen in the combination of all oxygen and hydrogen feedstreams is about 1.67.

11. The process of claim 1 wherein the hydrogen peroxide selectivity of the process is at least 90% and the overall yield based on hydrogen is at least 81%.

12. The process of claim 1 wherein the catalyst comprises supported noble metal catalyst.

13. The process of claim 12 wherein said supported noble metal is selected from the group consisting of supported palladium, platinum and mixtures thereof.

14. The process of claim 13 wherein said noble metal contains an orderly liner arrangement of crystal faces having 110 and/or 220 exposition.

15. The process of claim 1 wherein the conditions to convert hydrogen and oxygen to hydrogen peroxide comprise temperature between 0° C. and 100° C. and a pressure between 1 bar and 100 bar.

16. A direct catalytic process for the conversion of hydrogen and oxygen to hydrogen peroxide in a multi-stage catalytic reactor with minimum recycle requirement, said process comprising:

introducing a feedstream comprising oxygen, hydrogen and liquid media into the reactor first stage inlet in contact with catalyst at a molar ratio of oxygen to hydrogen between 1.5 and 10, wherein said reactor stages are maintained under conditions sufficient to convert hydrogen and oxygen to hydrogen peroxide;

introducing a supplemental feed consisting essentially of hydrogen into the downstream feedstream of all sequential catalyst-containing stages in an amount sufficient to reestablish the molar ratio of oxygen to hydrogen at the inlet of each sequential stage to that ratio corresponding to the molar ratio established at the first stage inlet;

separating the reactor effluent to recover hydrogen peroxide and a recycle stream of unconverted oxygen and hydrogen having a molar ratio of oxygen to hydrogen that is substantially less than the oxygen to hydrogen molar ratio introduced into each sequential stage.

17. The process of claim 16 wherein the liquid media comprises aqueous or organic solvents and mixtures thereof.

18. The process of claim 16 wherein the catalyst comprises supported noble metal catalyst.

19. The process of claim 16 wherein the reactor stage conditions for converting hydrogen and oxygen to hydrogen peroxide comprise temperature between 0° C. and 100° C. and a pressure between 1 bar and 100 bar.

20. The process of claim 16 wherein the first stage inlet molar ratio of oxygen to hydrogen is about 2 to 4.

21. A direct catalytic process for the conversion of hydrogen and oxygen to hydrogen peroxide in a multi-stage catalytic reactor, said process comprising:

introducing a feedstrcam comprising oxygen, hydrogen and a liquid media into a first catalyst-containing stage of the multi-stage catalytic reactor at an initial molar ratio of oxygen to hydrogen between 1.5 and 10;

maintaining the first catalyst-containing stage under conditions sufficient to convert hydrogen and oxygen to hydrogen peroxide as the feedstreamn is fed therethrough;

introducing supplemental hydrogen into a downstream feedstream near an inlet of one or more sequential catalyst-containing stages to lower the molar ratio of oxygen to hydrogen in the downstream feedstream to a ratio that is closer to the initial molar ratio, wherein essentially no supplemental oxygen is introduced into the one or more sequential catalyst-containing stages such that the overall molar ratio of oxygen to hydrogen consumed in the process is less than the initial molar ratio;

maintaining the one or more sequential catalyst-containing stages under conditions sufficient to convert hydrogen and oxygen to hydrogen peroxide as the feedstream is fed therethrough; and recovering hydrogen peroxide from a reactor effluent.

22. The process of claim 21, wherein the overall ratio of oxygen to hydrogen consumed throughout the process is from 1 to 1.67.

23. A method for direct catalytic conversion of hydrogen and oxygen to hydrogen peroxide, comprising:

introducing a feedstream comprising oxygen, hydrogen, and a liquid media into a first catalytic conversion zone of a multi-stage catalylic reactor, the reactor being comprised of a plurality of serially connected catalytic conversion zones and a catalyst for converting hydrogen and oxygen to hydrogen peroxide, the feedstream having an initial molar ratio of oxygen to hydrogen between 1.5 and 10;

converting hydrogen and oxygen to hydrogen peroxide in each of the catalytic conversion zones, a portion of the oxygen in the initial feedstream being consumed in each of the catalytic conversion zones such that each successive catalytic conversion zone includes less oxygen than a preceding catalytic conversion zone, introducing supplemental hydrogen into one or more catalyst conversion zones downstream from the first catalytic conversion zone in order to lower the molar ratio of oxygen to hydrogen in the one or more downstream catalyst conversion zones to a ratio that is closer to the initial molar ratio in the first catalytic conversion zone.

24. The method of claim 23, wherein the overall ratio of oxygen to hydrogen consumed throughout the process is from 1 to 1.67.

* * * * *

UNITED STATES PATENT AND TRADEMARK OFFICE
CERTIFICATE OF CORRECTION

| | | |
|---|---|---|
| PATENT NO. | : 7,067,103 B2 | Page 1 of 1 |
| APPLICATION NO. | : 10/401351 | |
| DATED | : June 27, 2006 | |
| INVENTOR(S) | : Rueter | |

It is certified that error appears in the above-identified patent and that said Letters Patent is hereby corrected as shown below:

Title Page
Page 3, Item 56, References Cited, Other Publications, Lordi et al., line 2, change "hydrogenation" to --Hydrogenation--

Column 5
Line 21, change "injection" to --injections--

Column 6
Line 39, change "O2:H2" to --$O_2$:$H_2$--
Line 44, change "breate" to --creates--
Line 49, change "O2:H2" to --$O_2$:$H_2$--
Line 50, change "s" to --as--

Column 7
Line 37, after "Total 1667" change "454" to --455--
Line 58, after "Overall 90" change "12503" to --12502--

Column 8
Line 10, change "1664" to --1665--
Line 24, after "Total" change "1664" to --1665--

Column 9
Line 16, change "O2:H2" to --$O_2$:$H_2$--

Column 10
Line 26, change "(4001015 psia)" to --(15 psia to 1050 psia)--

Signed and Sealed this

Sixteenth Day of January, 2007

JON W. DUDAS
*Director of the United States Patent and Trademark Office*